UNITED STATES PATENT OFFICE.

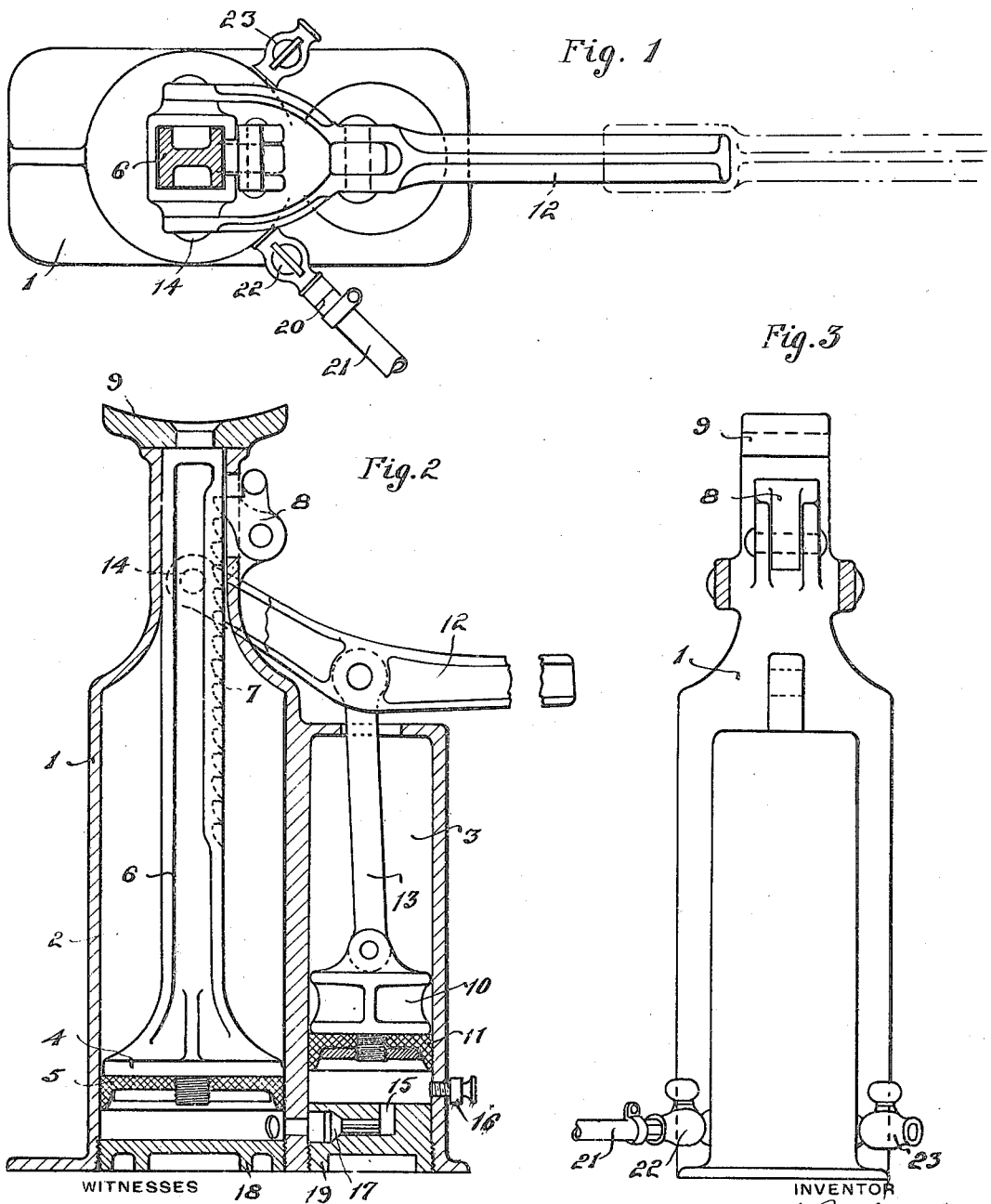

WILLIAM F. RAWLINGS, OF CLEVELAND, OHIO.

COMBINED AUTOMOBILE-JACK AND TIRE-PUMP.

1,213,012.          Specification of Letters Patent.      Patented Jan. 16, 1917.

Application filed July 7, 1914. Serial No. 849,556.

*To all whom it may concern:*

Be it known that I, WILLIAM F. RAWLINGS, a citizen of the United States, residing at Cleveland, in the county of Cuyahoga and State of Ohio, have invented new and useful Improvements in Combined Automobile-Jacks and Tire-Pumps, of which the following is a specification.

The invention relates to a combined jack and pump adapted to lift the wheel of an automobile and inflate its tire. The primary objects of the invention are to provide a simple and effective device capable of performing the two functions above specified. A single handle operates the two devices, and the jack when acting to support the wheel is held in a fixed rigid position, so that it is much easier to operate the pump to inflate the tire than is the case with the ordinary pump which must be held still with one hand or the foot while the handle is operated. One embodiment of the invention is illustrated in the accompanying drawings wherein—

Figure 1 is a plan view of the device with the lifting member of the jack shown in section, Fig. 2 is a vertical section through the device, and Fig. 3 is a side elevation with the operating handle in section.

The main body portion of the device comprises a casting 1, formed with the two cylinders 2 and 3. Mounted for reciprocation in the cylinder 2 is the piston 4 provided on its lower side with the cup leather 5 and on its upper side with the lifting member 6 of the jack. One face of the lifting member 6 is provided with the series of teeth 7 forming a rack, and with which the pawl 8 is adapted to engage and maintain the lifting member in any desired position of elevation to which it is moved. The upper end of the lifting member 6 is provided with the shoe 9 adapted to engage the axle of the automobile with which the jack is used.

The smaller cylinder 3 is provided with a piston 10 having upon its lower face the cup leather 11. This piston 10 is reciprocated from the handle 12 by means of the link 13, the handle 12 being forked at its end as indicated in Fig. 1 and pivoted at 14 to the upper portion of the casting 1 constituting the framework of the device.

A passageway 15 connects the lower ends of the cylinders 2 and 3, and air is supplied beneath the piston 10 on its up stroke through the inlet valve 16, such inlet valve being provided with a check valve for preventing the outward flow of air therethrough on the downward movement of the piston 10. The passage 15 is also provided with a check valve 17 which permits a flow of air from the cylinder 3 to the cylinder 2, but prevents any reverse flow of air. The lower ends of the cylinders 2 and 3 are closed by means of the heads 18 and 19 respectively, such heads being screw threaded into position as indicated in Fig. 2.

In order that the air supplied beneath the piston 4 may be conducted to a tire after the automobile wheel is raised from the ground, a connection 20 is provided (Figs. 1 and 3) such connection engaging a flexible pipe 21, the flow of air therethrough being controlled by means of the cut-off valve 22. In order to permit the lowering of the lifting member 6 and the wheel carried thereby, the lower end of the cylinder 2 is provided with the bleed cock or valve 23, by means of which it is possible to control the flow of air from the space beneath the piston 4 to the atmosphere.

The operation, when it is desired to inflate the tire, is as follows:—The shoe 9 is placed beneath the axle of the automobile and the handle 12 is moved up and down thus pumping air from the cylinder 3 to the cylinder 2 and causing the piston 4 to rise. This pumping action is continued until the wheel is lifted from the ground, the pawl 8 serving to hold the lifting member 6 at the position to which it has been moved after the operation of the handle 12 has ceased. The pipe 21 is then connected with the stem of the automobile tube and the valve 22 moved to position as indicated in Fig. 1, thus placing the body of the compressed air beneath the piston 4 in communication with tire. The handle 12 is then operated to pump the desired quantity of air into the tire, after which the valve 22 is closed and the handle 12 operated to move the lifting member slightly upward. This slight upward movement of the lifting member permits of the release of the pawl 8, such member being moved back to release position and the valve 23 opened, thus permitting the piston and the automobile wheel carried thereby to be moved down.

The apparatus as illustrated and described is advantageous not only because of the fact that the one-piece apparatus can be made to perform the two functions of lifting and pumping hitherto requiring two distinct devices, but because the pumping apparatus in connection with the jack is much more easily operated than a separate pumping device. This ease of operation is due to the fact that the jack when performing its function of supporting the axle is held in a fixed position so that the only operation required in order to inflate the tire is the reciprocation of the handle 12 and no attention or effort is required in holding the pump steady as in the case where a separate pump is used requiring support by the operator's foot or his other hand. In those cases where the automobile is equipped with an engine driven air pump, a hose connection may be made therefrom to the cock 23 and the piston is raised by the power thus supplied instead of by the hand pump operated by the handle 12. The air pressure thus supplied could be made to perform the double function of lifting the axle and pumping the tire or of merely lifting the axle, the cock 22 being closed in the latter event.

What I claim is:

1. In combination in an automobile jack, a fixed jack member, a relatively movable lifting member, manually releasable catch means for holding the lifting member at any desired position, air operated means for moving the lifting member upward, an air pump carried by said fixed jack member for supplying air to the air operated means, a connection leading from the jack whereby the air compressed by the pump may be supplied for use in other relations and the pump operated to supply such air while the catch holds the lifting member in elevated position, and a cut-off valve for the said connection.

2. In combination in an automobile lifting and pumping device, a cylinder, a lifting member, an air pump for supplying air to the cylinder to move the lifting member, a catch for holding the lifting member of the jack in elevated position, and a supply connection provided with a valve leading from the cylinder.

3. In combination in an automobile lifting and pumping device, a pneumatic jack including a cylinder and piston, an air pump carried by the cylinder, a supply connection from the pump to the cylinder, a check valve in the connection, a catch for holding the lifting member of the jack in elevated position, a connection provided with a cut off valve leading from the cylinder whereby the air supplied by the pump may be conducted away for use in other relations, and a bleed passage provided with a valve for permitting an escape of air from the jack to lower the said lifting member after the catch is released.

In testimony whereof I have hereunto signed my name in the presence of the two subscribed witnesses.

WILLIAM F. RAWLINGS. [L. S.]

Witnesses:
 O. H. GRAY,
 LEWIS B. FOOTE.